US012676486B2

(12) United States Patent
Li et al.

(10) Patent No.:  US 12,676,486 B2
(45) Date of Patent:      Jul. 7, 2026

(54) HYDRO-PHOTOVOLTAIC COMPLEMENTARY OPERATION CHART APPLICATION METHOD FOR CLEAN ENERGY BASE

(71) Applicants: Huaneng Lancang River Hydropower Inc, Kunming (CN); POWERCHINA Guiyang Engineering Corporation Limited, Guiyang (CN); Hohai University, Nanjing (CN); Huaneng Group R&D Center Co., Ltd., Beijing (CN)

(72) Inventors: Xu Li, Kunming (CN); Dacheng Li, Kunming (CN); Xianfeng Huang, Kunming (CN); Jian Zhou, Kunming (CN); Huawei Xiang, Kunming (CN); Feng Wu, Kunming (CN); Yun Tian, Kunming (CN); Di Wu, Kunming (CN); Chang Xu, Kunming (CN); Xinglin Duan, Kunming (CN); Yanqing Zhang, Kunming (CN); Yuan Zheng, Kunming (CN); Wenbo Huang, Kunming (CN); Min Xu, Kunming (CN); Hong Pan, Kunming (CN); Zhiyuan Wu, Kunming (CN); Hucheng Xianyu, Kunming (CN); Wennan Yuan, Kunming (CN); Lijun Yin, Kunming (CN)

(73) Assignees: Huaneng Lancang River Hydropower Inc, Kunming (CN); POWERCHINA Guiyang Engineering Corporation Limited, Guiyang (CN); Hohai University, Nanjing (CN); Huaneng Group R&D Center Co., Ltd., Beijing (CN)

( * ) Notice: Subject to any disclaimer, the term of this patent is extended or adjusted under 35 U.S.C. 154(b) by 364 days.

(21) Appl. No.: 18/466,633

(22) Filed: Sep. 13, 2023

(65) Prior Publication Data
US 2024/0047971 A1      Feb. 8, 2024

Related U.S. Application Data

(63) Continuation of application No. PCT/CN2023/111168, filed on Aug. 4, 2023.

(30) Foreign Application Priority Data

Aug. 8, 2022    (CN) ......................... 202210942941.1

(51) Int. Cl.
*H02J 3/38*          (2026.01)
*H02J 101/24*        (2026.01)
*H02J 103/30*        (2026.01)

(52) U.S. Cl.
CPC ............. *H02J 3/38* (2013.01); *H02J 2101/24* (2026.01); *H02J 2103/30* (2026.01)

(58) Field of Classification Search
CPC ....... H02J 3/38; H02J 2203/20; H02J 2300/24
(Continued)

(56) References Cited

U.S. PATENT DOCUMENTS

| | | | | |
|---|---|---|---|---|
| 9,811,061 | B1 * | 11/2017 | Hu ........................... | H02J 3/004 |
| 2023/0268742 | A1 * | 8/2023 | Shen ....................... | H02J 3/004 |
| | | | | 700/291 |
| 2023/0367280 | A1 * | 11/2023 | Zhou .................... | G05B 19/042 |

* cited by examiner

*Primary Examiner* — Jigneshkumar C Patel

(57)          ABSTRACT

A hydro-photovoltaic complementary operation chart application method for a clean energy base includes: divide a hydro-photovoltaic complementary operation chart into two sub-operation charts by runoff probability and critical probability; predict runoff and predicted photovoltaic output during the operation cycle, select the sub-operation chart by the runoff probability, determine hydropower output of a reservoir in the current month according to water level of the
(Continued)

reservoir at the beginning of the current month and the operation area, and obtain the water level of the reservoir at the end of the current month through the runoff calculation; obtain long-term hydropower output process and reservoir level process in the clean energy base until the hydropower output and water level of the reservoir in all months of the operation cycle are calculated, and calculate hydropower generation probability to complete operation.

9 Claims, 4 Drawing Sheets

(58) Field of Classification Search
USPC ......................................................... 700/287
See application file for complete search history.

HYDRO-PHOTOVOLTAIC COMPLEMENTARY OPERATION CHART APPLICATION METHOD FOR CLEAN ENERGY BASE

CROSS-REFERENCE TO RELATED APPLICATIONS

This application is a continuation of PCT/CN2023/111168, filed Aug. 4, 2023 and claims priority of Chinese Patent Application No. 202210942941.1, filed on Aug. 8, 2022, the entire contents of which are incorporated herein by reference.

TECHNICAL FIELD

The invention relates to the hydro-photovoltaic complementary power generation technology, in particular to a hydro-photovoltaic complementary operation chart application method for a clean energy base.

BACKGROUND ART

With the transformation of the energy power system to the clean and efficient system, the clean energy base with a multi-energy hybrid complementary system as the application scenario has broad development prospects. Taking hydro-photovoltaic complementary power generation mode as an example, the single operation mode of the traditional conventional operation chart has been unable to meet the hydro-photovoltaic complementary operation process due to the access of large-scale photovoltaic power. For example, the conventional operation chart will guide the reservoir to increase the hydropower output in the rapid level rise stage of the reservoir during the flood season, this will seriously squeeze the grid-connected space of the photovoltaic power transmission channel, resulting in the squeeze of hydropower and photovoltaic power in the transmission channel and leading to a large quantity of discarded power, which has an adverse impact on the utilization and development of clean energy. How to propose a more comprehensive application strategy of hydro-photovoltaic complementary operation chart is the key technology to solve the above problems.

CONTENT OF INVENTION

Purpose of the invention: the invention aims to provide a hydro-photovoltaic complementary operation chart application method for a clean energy base, considering the grid-connected consumption of photovoltaic power in the reservoir operation process.

Technical proposal: The invention relates to a hydro-photovoltaic complementary operation chart application method for a clean energy base, which includes the following steps:

S1. Divide a hydro-photovoltaic complementary operation chart into two sub-operation charts by runoff probability and critical probability during the operation cycle: conventional operation chart and hydro-photovoltaic complementary operation chart, divide each sub-operation chart into different operation areas by operation curves, and hydropower output information is provided in each operation area;

S2. Predict runoff and predicted photovoltaic output during the operation cycle, and calculate the runoff probability, select the corresponding conventional operation chart if the runoff probability is less than the critical probability, determine hydropower output of a reservoir in the current month according to water level of the reservoir at the beginning of the current month and the operation area, obtain the water level of the reservoir at the end of the current month through the runoff calculation, and then perform Step S5; perform Step S3 if the runoff probability is more than or equal to the critical probability;

S3. Select a sub-operation chart corresponding to the runoff probability as the hydro-photovoltaic complementary operation chart, calculate predicted critical output of the current month according to predicted photovoltaic output of the current month, judge whether the current month is in the flood season, and take the predicted critical output as the hydropower output in the critical output area if the current month is in the flood season; take the guaranteed output as the hydropower output in the critical output area if the current month is not in the flood season;

S4. Determine the hydropower output of the reservoir in the current month according to the water level of the reservoir at the beginning of the current month and the operation area, and obtain the water level at the end of the current month through the runoff calculation;

S5. Check whether the operation cycle ends; if yes, perform Step S6; otherwise, return to Step S2 and calculate the hydropower output and water level of the reservoir in the next month within the operation cycle;

S6. Obtain the long-term hydropower output process, the reservoir level process and the hydropower generation probability in the clean energy base, and the operation is completed.

Further, the critical probability in Step S1 is as follows:

Calculate the runoff probability of multiple operation cycles according to the runoff data to form the runoff probability set, and arrange the operation cycles and the corresponding runoff data in ascending order based on the runoff probability;

Transfer photovoltaic output data of the typical years to establish an optimal operation model, carry out optimal operation calculation for the operation cycles with the goal of maximizing the total consumed hydro-photovoltaic power, record the discarded power of the operation cycles in the process, and screen the discarded power of the operation cycles according to the runoff probability set until no discarded power is generated in all operation cycles arranged after a certain operation cycle to which the runoff probability corresponds is the critical probability.

Further, an objective function of the optimal operation model is as follows:

$$w = \max \sum\nolimits_{m=1}^{M} \left( W_m^h + W_m^p - W_m^q \right);$$

Wherein, W is total consumed hydro-photovoltaic power during the operation cycle;

$$W_m^h$$

is consumed hydropower in the month m;

$$W_m^p$$

is consumed photovoltaic power in the month m;

$$W_m^q$$

is discarded power in the month m;

The discarded power during the operation cycle is calculated as follows:

$$G_m = \sum_{t=1}^{T} \max\left(N_m^h + N_{m,t}^p - N^c,\ 0\right);$$

$$F_m = \sum_{t=1}^{T} \min\left\{N_{m,max}^h - N_m^h \searrow \max\left(N^c - \left(N_{m,t}^p + N_m^h\right) \searrow 0\right)\right\};$$

$$W_m^q = \max(G_m - F_m, 0);$$

$$W^q = \sum_{m=1}^{12} W_m^q;$$

Wherein, $W^q$ is discarded power during the operation cycle;

$$N_m^h$$

is the hydropower output data of the month m;

$$N_{m,t}^p$$

is 24-hour photovoltaic output data of the month m; $N^c$ is maximum load of the transmission channel;

$$N_{m,max}^h$$

is upper limit of the hydropower output in the month m; $G_m$ indicates that superimposed output of hydropower and photovoltaic power in the month m exceeds the sum of the maximum load of a transmission channel; $F_m$ represents a maximum output space that can be given for the photovoltaic output in the month m while the total hydropower output is unchanged;

Constraint functions of the optimal operation model are as follows:

Water balance constraint, reservoir level constraint, power discharge constraint, discharge volume constraint, reservoir output constraint, and variable nonnegative constraint.

Further, the operation curves, operation areas and hydropower output information of the conventional operation chart in Step S1 are as follows:

Extract i operation cycles with the runoff probability less than the critical probability, which form a discarded power operation cycle set, obtain the month under the saturated condition through the optimal operation calculation with the goal of maximizing the total consumed hydro-photovoltaic power and then obtain a water storage hydrograph, obtain a water storage hydrograph set of the discarded power operation cycle set until the water storage hydrographs of the discarded power operation cycle set in flood season are calculated, take upper and lower envelope curves of the water storage hydrograph set to obtain upper and lower basic operation curves in the flood season, and replace the upper basic operation curve with a guide curve;

Extract runoff data of the discarded power operation cycle in the dry season, adjust from the water level at the end of the dry season, calculate fixed output in reverse time sequence according to the guaranteed output until the beginning of the dry season to obtain a water supply hydrograph, obtain a water supply hydrograph set of the discarded power operation cycle set until the water supply hydrographs of the discarded power operation cycle set are calculated, and take the upper and lower envelope curves of the water supply hydrograph set to obtain upper and lower basic operation curves in the dry season;

Obtain the upper and lower basic operation curves of the operation cycle based on the calculation of the water storage hydrograph set of the discarded power operation cycle set for the flood season and the water supply hydrograph set for the dry season, and divide a conventional operation chart into a hydropower increased output area, a hydropower guaranteed output area and a hydropower decreased output area in turn from top to bottom according to the upper and lower basic operation curves;

If the water level in the current operation period is higher than the upper basic operation curve, take the increased output as the hydropower output; if the water level in the current operation period is lower than the upper basic operation curve, take the decreased output as the hydropower output; if the water level in the current operation period is between the upper and lower basic operation curves, take the guaranteed output as the hydropower output.

Further, the operation curves, operation areas and hydropower output information of the hydro-photovoltaic complementary operation chart in Step S1 are as follows:

Extract j operation cycles with the runoff probability more than the critical probability, divide the j operation cycles into k groups by the runoff probability to form k complementary operation cycle sets, each of which has multiple operation cycles, and the information of the $i^{th}$ complementary operation cycle set is as follows:

(1) Obtain the month under the saturated condition through the optimal operation calculation with the goal of maximizing the consumed hydro-photovoltaic power, calculate the fixed output in reverse time sequence at the end of the month under the saturated condition according to the critical output data until the fixed output is calculated for each period, and then obtain the water storage hydrograph, obtain the water storage hydrograph set of the complementary operation cycle set until the water storage hydrographs of the complementary operation cycle set in the flood season are calculated, take the upper and lower envelope curves of the water storage hydrograph set to obtain the upper and lower basic operation curves in the flood season, and replace the upper basic operation curve with the guide curve;

(2) Extract the runoff data of the complementary operation cycle set in the dry season, adjust from the water level at the end of the dry season, calculate the fixed output in reverse time sequence according to the guaranteed output until the beginning of the dry season to obtain the water supply hydrograph, obtain the water supply hydrograph set of the complementary operation cycle set until the water supply hydrographs of the complementary operation cycle set are calculated, take the upper and lower envelope curves of the water supply hydrograph set to obtain the upper and lower basic operation curves in the dry season;

(3) Obtain the upper and lower basic operation curves of the operation cycle based on the calculation of the water storage hydrograph set of the complementary operation cycle set for the flood season and the water supply hydrograph set for the dry season, and divide the hydro-photovoltaic operation chart into a hydropower increased output area, a hydropower critical output area and a hydropower decreased output area in turn from top to bottom according to the upper and lower basic operation curves;

(4) If the water level in the current operation period is higher than the upper basic operation curve, take the increased output as the hydropower output; if the water level in the current operation period is lower than the upper basic operation curve, take the decreased output as the hydropower output; if the water level in the current operation period is between the upper and lower basic operation curves, take the predicted critical output as the hydropower output;

(5) Obtain information of the $i^{th}$ complementary operation cycle set, return to Step (1) until the information of k complementary operation cycle sets is obtained, and the calculation is completed.

Further, the critical output data is calculated as follows:

$$N_m^h = N_m^{ij}$$

exists to make $$G_m^y = F_m^y;$$

Wherein, $$N_m^h$$

is hydropower output data of the month m;

$$N_m^{ij}$$

is critical output data; $G_m$ indicates that superimposed output of hydropower and photovoltaic power in the month m exceeds the sum of the maximum load of a transmission channel; $F_m$ represents a maximum output space that can be given for the photovoltaic output in the month m while the total hydropower output is unchanged;

The predicted critical output is calculated as follows:

$$G_m^y = \sum_{t=1}^{T} \max\left(N_m^h + N_{m,t}^{py} - N^c, 0\right)$$

$$F_m^y = \sum_{t=1}^{T} \min\left\{N_{m,\max}^h - N_m^h \max\left(N^c - \left(N_{m,t}^{py} + N_m^h\right), 0\right)\right\}$$

$$N_m^h = N_m^{ijy} \text{ exists to make } G_m^y = F_m^y;$$

Wherein, $$N_m^{ijy}$$

is predicted critical output;

$$N_{m,t}^{py}$$

is 24-hour photovoltaic output data of the month m;

$$G_m^y$$

indicates that superimposed output of hydropower and photovoltaic power in the month m exceeds the sum of the maximum load of a transmission channel;

$$F_m^y$$

represents a maximum output space that can be given for the photovoltaic output in the month m while the total hydropower output is unchanged.

Further, when the reservoir operation period is in the flood season, the hydropower output information of the increased output area is the predicted critical output of the current month multiplied by an increase ratio coefficient, which is a constant; the hydropower output information of the decreased output area is the predicted critical output of the current month multiplied by a decrease ratio coefficient, which is a constant;

When the reservoir operation period is in the dry season, the hydropower output information of the increased output area is the hydropower guaranteed output of the current month multiplied by the increase ratio coefficient, which is a constant; the hydropower output information of the decreased output area is the hydropower guaranteed output of the current month multiplied by the decrease ratio coefficient, which is a constant.

Further, the calculation formula of the hydropower generation probability in Step S6 is as follows:

$$P=M/12$$

Wherein, M is the number of months in which the hydropower output of the reservoir is not less than the hydropower guaranteed output under the guidance of the hydro-photovoltaic complementary operation chart application method.

A hydro-photovoltaic complementary operation chart application system for a clean energy base comprises:

A hydro-photovoltaic complementary operation chart dividing module, used to divide the hydro-photovoltaic complementary operation chart into two sub-operation charts by the runoff probability and the critical probability, which are divided into different operation areas having respective hydropower output information by operation curves;

A sub-operation chart selecting module, used to predict the runoff and predicted photovoltaic output during the operation cycle, calculate the runoff probability, and select the corresponding sub-operation chart by the runoff probability;

A scheduling module, used to schedule the hydro-photovoltaic complementary operation chart; if the selected sub-operation chart is a conventional operation chart, determine the hydropower output of the reservoir in the current month according to the water level of the reservoir at the beginning of the current month and the operation area, and obtain the water level at the end of the current month through the runoff calculation; if the selected sub-operation chart is a hydro-photovoltaic complementary operation chart, calculate the predicted critical output of the current month based on the predicted photovoltaic output of the current month, judge whether the current month is in the flood season, and take the predicted critical output as the hydropower output in the critical output area if the current month is in the flood season; take the guaranteed output as the hydropower output in the critical output area if the current month is not in the flood season; determine the hydropower output of the reservoir in the current month according to the water level of the reservoir at the beginning of the current month and the operation area, and obtain the water level at the end of the current month through the runoff calculation; obtain the long-term hydropower output process and the reservoir level process in the clean energy base until the hydropower output and water level of the reservoir in all months of the operation cycle are calculated, and obtain the hydropower generation probability to complete the operation.

A device of the invention comprises a memory and a processor, wherein:

The memory is used to store computer programs capable of running on the processor;

The processor is used to execute the steps of the hydro-photovoltaic complementary operation chart application method for the clean energy base when running the computer programs.

Beneficial effects: Compared with the prior art, on the one hand, the invention divides the hydro-photovoltaic complementary operation chart into two sub-operation charts by the runoff probability and the critical probability during the operation cycle: conventional operation chart and hydro-photovoltaic complementary operation chart, divides each sub-operation chart into different operation areas by operation curves, and hydropower output information is provided in each operation area, being more conducive to various runoff conditions of the reservoir; on the other hand, the invention consider the grid-connected consumption of photovoltaic power by introducing the hydropower critical output, which is more beneficial to the hydropower in flood season to make the transmission channel space for the photovoltaic grid-connected power, improving the consumption level of photovoltaic power while ensuring hydropower output.

EMBODIMENTS

The invention is further described in detail in combination with the drawings and the embodiments. The following embodiments are used to illustrate the invention, but not to limit the scope of the invention.

Figure 1:
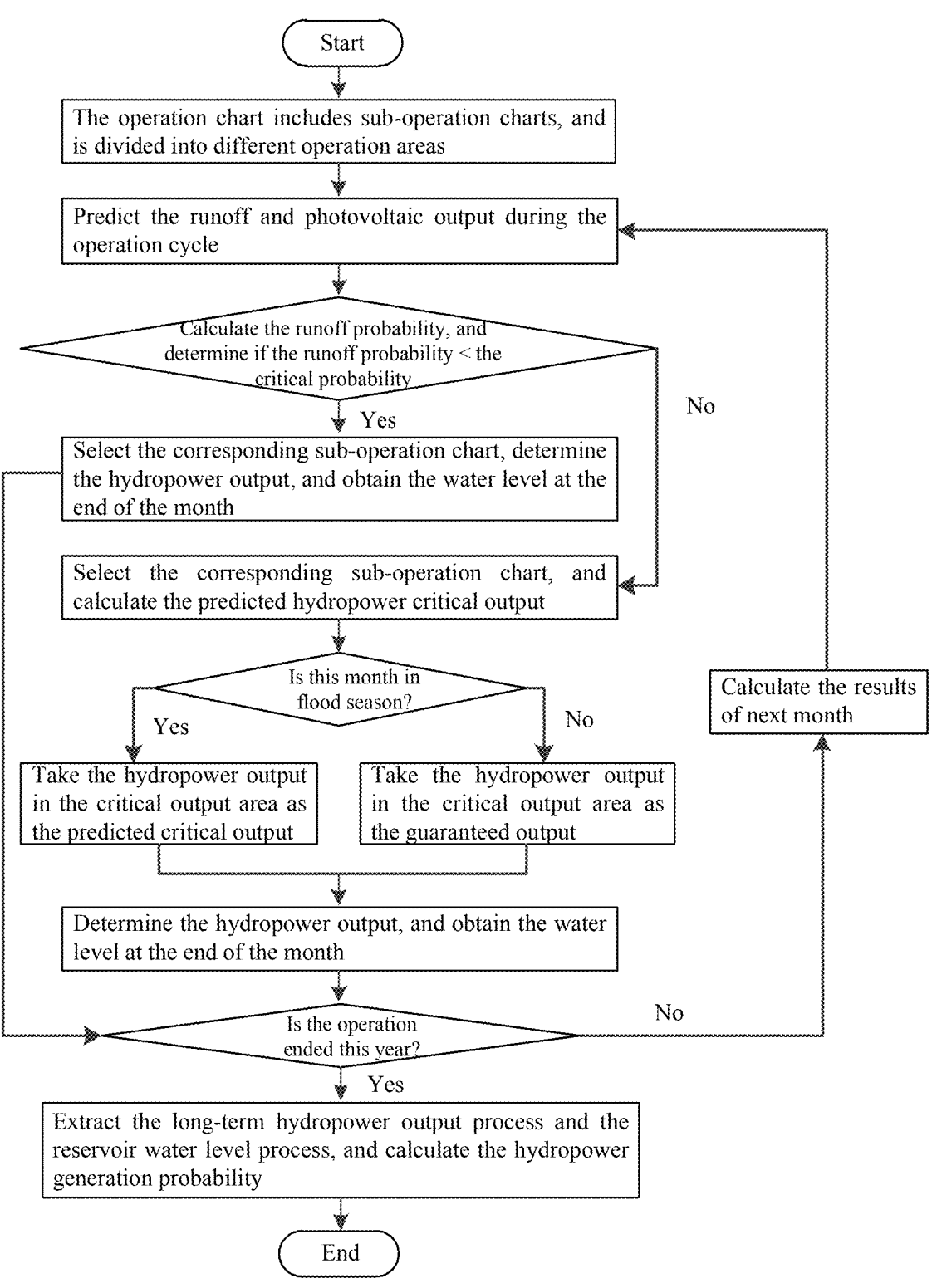
FIG. 1 is the flow chart of the application method of the invention.

The invention relates to a hydro-photovoltaic complementary operation chart application method for a clean energy base. The operation cycle of the clean energy base is set to year, the operation period is set to month, and the operation cycle and period can be set according to the operation requirements of the project. As shown in FIG. 1, the application method includes the following steps:

S1. Divide a hydro-photovoltaic complementary operation chart into two sub-operation charts by runoff probability and critical probability during the operation cycle: conventional operation chart and hydro-photovoltaic complementary operation chart, the sub-operation charts are conventional operation charts when the runoff probability is less than the critical probability, and the sub-operation charts are hydro-photovoltaic complementary operation charts when the runoff probability is more than the critical probability; divide each sub-operation chart into different operation areas by operation curves, and hydropower output information is provided in each operation area;

The critical probability is described as follows:

Calculate the runoff of multiple operation cycles according to runoff data to form the runoff probability set, and arrange the operation cycles and the corresponding runoff data in ascending order based on the runoff probability; transfer photovoltaic output data of the typical years to establish an optimal operation model, carry out optimal operation calculation for the operation cycles with the goal of maximizing the total consumed hydro-photovoltaic power, record discarded power of the operation cycles in the process, and screen the discarded power of the operation cycles according to the runoff probability set until no discarded power is generated in all operation cycles arranged after a certain operation cycle to which the runoff probability corresponds is the critical probability.

An objective function of the optimal operation model is as follows:

$$W = \max\sum\nolimits_{m=1}^{M}\left(W_m^h + W_m^p - W_m^q\right);$$

Wherein, W is total consumed hydro-photovoltaic power during the operation cycle;

$$W_m^h$$

is consumed hydropower in the month m;

$$W_m^p$$

is consumed photovoltaic power in the month m;

$$W_m^q$$

is discarded power in the month m;

The discarded power during the operation cycle is calculated as follows:

$$G_m = \sum_{t=1}^{T} \max\left(N_m^h + N_{m,t}^p - N^c,\ 0\right);$$

$$F_m = \sum_{t=1}^{T} \min\left\{N_{m,\max}^h - N_m^h,\ \max\left(N^c - \left(N_{m,t}^p + N_m^h\right),\ 0\right)\right\};$$

$$W_m^q = \max(G_m - F_m,\ 0);$$

$$W^q = \sum_{m=1}^{12} W_m^q;$$

Wherein, $W^q$ is discarded power during the operation cycle;

$$N_m^h$$

is hydropower output data of the month m;

$$N_{m,t}^p$$

is 24-hour photovoltaic output data of the month m; $N^c$ is maximum load of the transmission channel;

$$N_{m,max}^h$$

is upper limit of the hydropower output in the month m; $G_m$ indicates that superimposed output of hydropower and photovoltaic power in the month m exceeds the sum of the maximum load of a transmission channel; $F_m$ represents a maximum output space that can be given for the photovoltaic output in the month m while the total hydropower output is unchanged;

Constraint functions of the optimal operation model are as follows:

Water balance constraint, reservoir level constraint, power discharge constraint, discharge volume constraint, reservoir output constraint, and variable nonnegative constraint. Specific constraints are determined according to the operation characteristics of the project. Key constraint information of the embodiment is shown in Table 1.

TABLE 1

| Constraint Information | | | | | |
|---|---|---|---|---|---|
| Maximum water level | Minimum water level | Upper limit of hydropower output | Hydropower guaranteed output | Maximum discharged volume | Minimum discharged volume |
| /m | /m | /10,000 kW | /10,000 kW | /m³ · s¹ | /m³ · s¹ |
| 2895 | 2815.5 | 260 | 69 | 1273 | 38 |

Through the above calculation, the critical probability of the embodiment is 50%, indicating that when the runoff probability of the operation cycle is less than 50%, power discard will also occur in the deterministic hydro-photovoltaic complementary optimal operation; otherwise, power discard will not occur.

The operation curves, operation areas and hydropower output information of the conventional operation chart are as follows:

Extract i operation cycles with the runoff probability less than the critical probability, which form a discarded power operation cycle set, obtain the month under the saturated condition through the optimal operation calculation with the goal of maximizing the total consumed hydro-photovoltaic power and then obtain the water storage hydrograph, obtain a water storage hydrograph set of the discarded power operation cycle set until the water storage hydrographs of the discarded power operation cycle set in flood season are calculated, take upper and lower envelope curves of the water storage hydrograph set to obtain upper and lower basic operation curves in the flood season, and replace the upper basic operation curve with a guide curve;

Extract runoff data of the discarded power operation cycle in the dry season, adjust from the water level at the end of the dry season, calculate fixed output in reverse time sequence according to the guaranteed output until the beginning of the dry season to obtain the water supply hydrograph, obtain a water supply hydrograph set of the discarded power operation cycle set until the water supply hydrographs of the discarded power operation cycle set are calculated, and take the upper and lower envelope curves of the water supply hydrograph set to obtain the upper and lower basic operation curves in the dry season;

Obtain the upper and lower basic operation curves of the operation cycle based on the calculation of the water storage hydrograph set of the discarded power operation cycle set for the flood season and the water supply hydrograph set for the dry season, and divide a conventional operation chart into a hydropower increased output area, a hydropower guaranteed output area and a hydropower decreased output area in turn from top to bottom according to the upper and lower basic operation curves;

If the water level in the current operation period is higher than the upper basic operation curve, take the increased output as the hydropower output; if the water level in the current operation period is lower than the upper basic operation curve, take the decreased output as the hydropower output; if the water level in the current operation period is between the upper and lower basic operation curves, take the guaranteed output as the hydropower output.

The operation curves, operation areas and hydropower output information of the hydro-photovoltaic complementary operation chart are as follows:

Extract j operation cycles with the runoff probability more than the critical probability, divide the j operation cycles into k groups by the runoff probability to form k complementary operation cycle sets, each of which has multiple operation cycles, and the information of the $i^{th}$ complementary operation cycle set is as follows:

(1) Obtain the month under the saturated condition through the optimal operation calculation with the goal of maximizing the consumed hydro-photovoltaic power, calculate the fixed output in reverse time sequence at the end of the month under the saturated condition according to the critical output data until the fixed output is calculated for each period, and then obtain the water storage hydrograph, obtain the water storage hydrograph set of the complementary operation cycle set until the water storage hydrographs of the complementary operation cycle set in the flood season are calculated, take the upper and lower envelope curves of the water storage hydrograph set to obtain the upper and lower basic operation curves in the flood season, and replace the upper basic operation curve with the guide curve;

(2) Extract the runoff data of the complementary operation cycle set in the dry season, adjust from the water level at the end of the dry season, calculate the fixed output in reverse time sequence according to the guaranteed output until the beginning of the dry season to obtain the water supply hydrograph, obtain the water supply hydrograph set of the complementary operation cycle set until the water supply hydrographs of the complementary operation cycle set are calculated, take the upper and lower envelope curves of the water supply hydrograph set to obtain the upper and lower basic operation curves in the dry season;

(3) Obtain the upper and lower basic operation curves of the operation cycle based on the calculation of the water storage hydrograph set of the complementary operation cycle set for the flood season and the water supply hydrograph set for the dry season, and divide the hydro-photovoltaic operation chart into a hydropower increased output area, a hydropower critical output area and a hydropower decreased output area in turn from top to bottom according to the upper and lower basic operation curves;

(4) If the water level in the current operation period is higher than the upper basic operation curve, take the increased output as the hydropower output; if the water level in the current operation period is lower than the upper basic operation curve, take the decreased output as the hydropower output; if the water level in the current operation period is between the upper and lower basic operation curves, take the predicted critical output as the hydropower output;

(5) Obtain information of the $i^{th}$ complementary operation cycle set, return to Step (1) until the information of k complementary operation cycle sets is obtained, and the calculation is completed.

The critical output data is calculated as follows:

$$N_m^h = N_m^{lj}$$

exists to make $G_m = F_m$;

Wherein, $$N_m^{lj}$$

is the critical output data;

The predicted critical output is calculated as follows:

$$G_m^y = \sum_{t=1}^{T} \max(N_m^h + N_{m,t}^{py} - N^c, 0);$$

$$F_m^y = \sum_{t=1}^{T} \min\{N_{m,max}^h - N_m^h \max(N^c - (N_{m,t}^{py} + N_m^h), 0)\};$$

$$N_m^h = N_m^{ljy}$$

exists to make $$G_m^y = F_m^y$$

Wherein, $$N_m^{ljy}$$

is predicted critical output;

$$N_{m,t}^{py}$$

is 24-hour photovoltaic output data of the month m;

$$G_m^y$$

indicates that superimposed output of hydropower and photovoltaic power in the month m exceeds the sum of the maximum load of a transmission channel;

$$F_m^y$$

represents a maximum output space that can be given for the photovoltaic output in the month m while the total hydropower output is unchanged.

Figure 2:
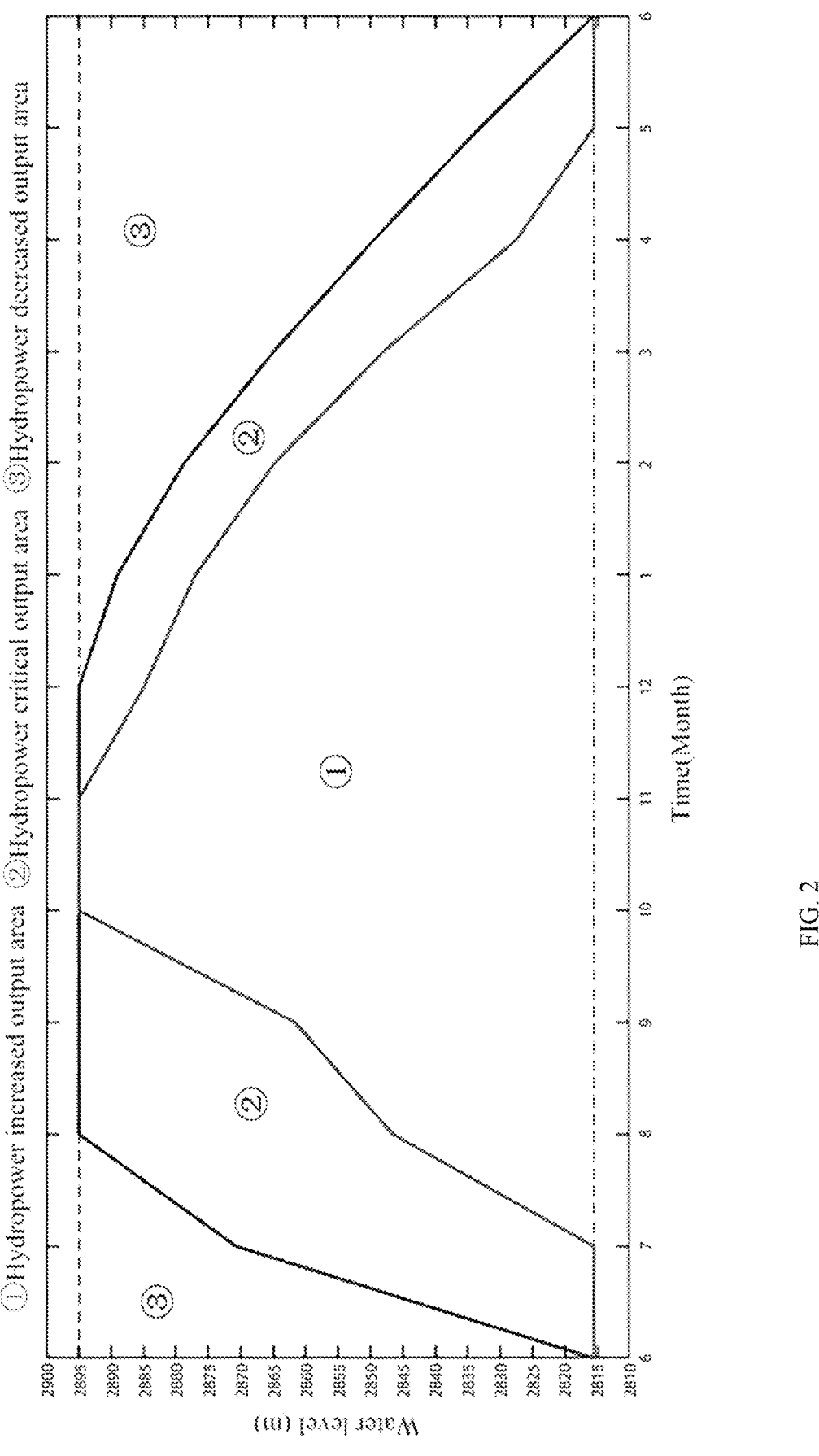
FIG. 2 is the sub-operation chart in the hydro-photovoltaic complementary operation chart.
Figure 3:
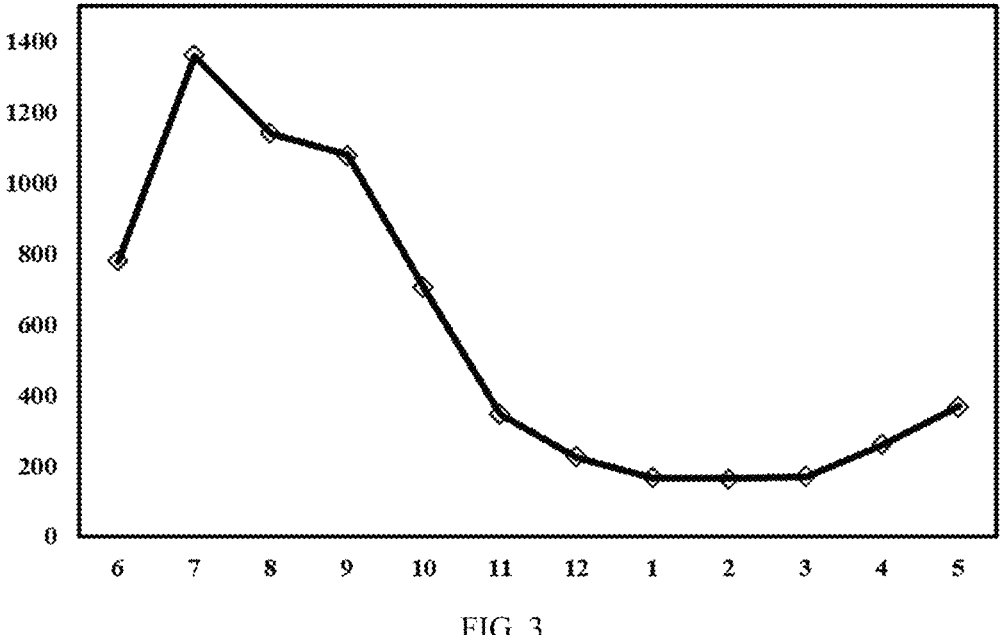
FIG. 3 shows the runoff process of the reservoir during the operation cycle.

When the reservoir operation period is in the flood season, the hydropower output information of the increased output area is the predicted critical output of the current month multiplied by an increase ratio coefficient, which is a constant, generally ranging from 1.2 to 1.5, and 1.3 used in the embodiment; the hydropower output information of the decreased output area is the predicted critical output of the current month multiplied by a decrease ratio coefficient, which is a constant, generally ranging from 0.8 to 0.5, and 0.8 used in the embodiment;

When the reservoir operation period is in the dry season, the hydropower output information of the increased output area is the hydropower guaranteed output of the current month multiplied by the increase ratio coefficient, which is a constant, generally ranging from 1.2 to 1.6, and 1.5 used in the embodiment; the hydropower output information of the decreased output area is the hydropower guaranteed output of the current month multiplied by the decrease ratio coefficient, which is a constant, generally ranging from 0.9 to 0.8, and 0.85 used in the embodiment;

S2. Predict runoff and predicted photovoltaic output during the operation cycle, and calculate the runoff probability, select the corresponding sub-operation chart if the runoff probability is less than the critical probability, i.e., select a conventional operation chart, determine hydropower output of a reservoir in the current month according to water level of the reservoir at the beginning of the current month and the operation area, obtain the water level of the reservoir at the end of the current month through the runoff calculation, and then perform Step S5; perform Step S3 if the runoff probability is more than or equal to the critical probability; as shown in FIG. 3, the runoff probability of the operation cycle in the embodiment is 53% based on the runoff process of the operation cycle; as shown in FIG. 2, select the complementary operation cycle set with the runoff probability of 50% to 60%, and obtain the operation curves, operation areas and hydropower output information of the sub-operation charts with the runoff probability of 50% to 60% according to Step S14.

S3. Select a sub-operation chart corresponding to the runoff probability, namely the hydro-photovoltaic complementary operation chart, calculate the predicted critical output of the current month according to the predicted photovoltaic output of the current month, judge whether the current month is in the flood season, and take the predicted critical output as the hydropower output in the critical output area if the current month is in the flood season; take the guaranteed output as the hydropower output in the critical output area if the current month is not in the flood season; in the embodiment, the calculation is performed by taking July as the operation period, which is in the flood season, and the calculated predicted critical output of July is 1.79 million kW.

S4. Determine the hydropower output of the reservoir in the current month according to the water level of the reservoir at the beginning of the current month and the operation area, and obtain the water level at the end of the current month through the runoff calculation; in the embodiment, the water level at the beginning of July, namely at the end of June, is 2856.6 m, which is located in the critical output area of the sub-operation chart, that is, the hydropower output in July is determined to be 1.79 million kW, and the water level at the end of July is 2895 m through the runoff calculation, the process is carried out successively until the end of the operation cycle, and the long-term reservoir level process and the hydropower output process in the clean energy base are obtained.

Figure 4:
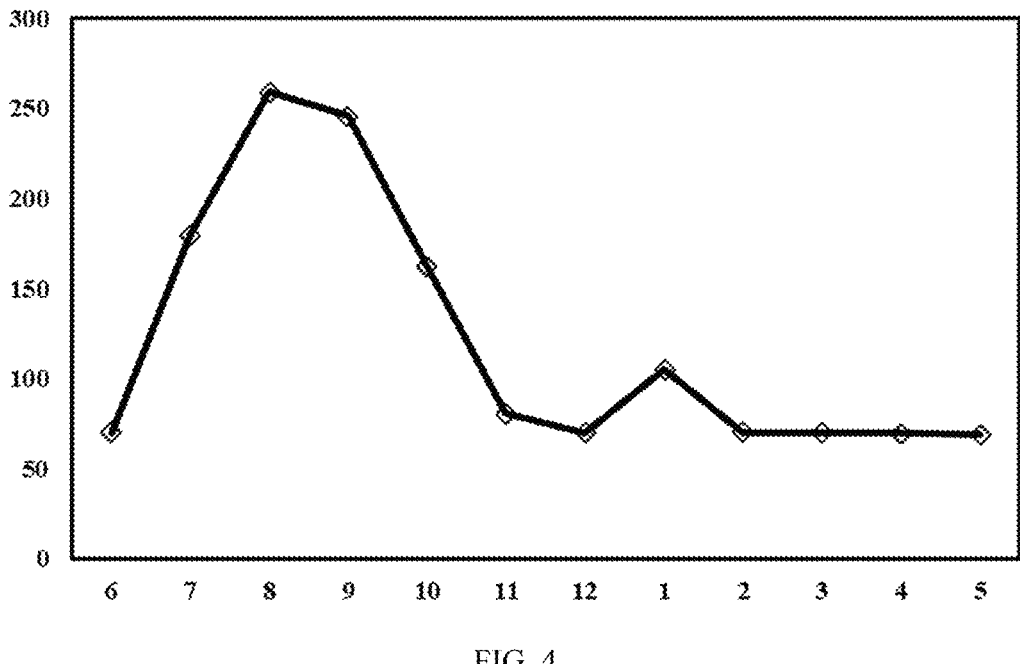
FIG. 4 shows the hydropower output process of the reservoir during the operation cycle.
Figure 5:
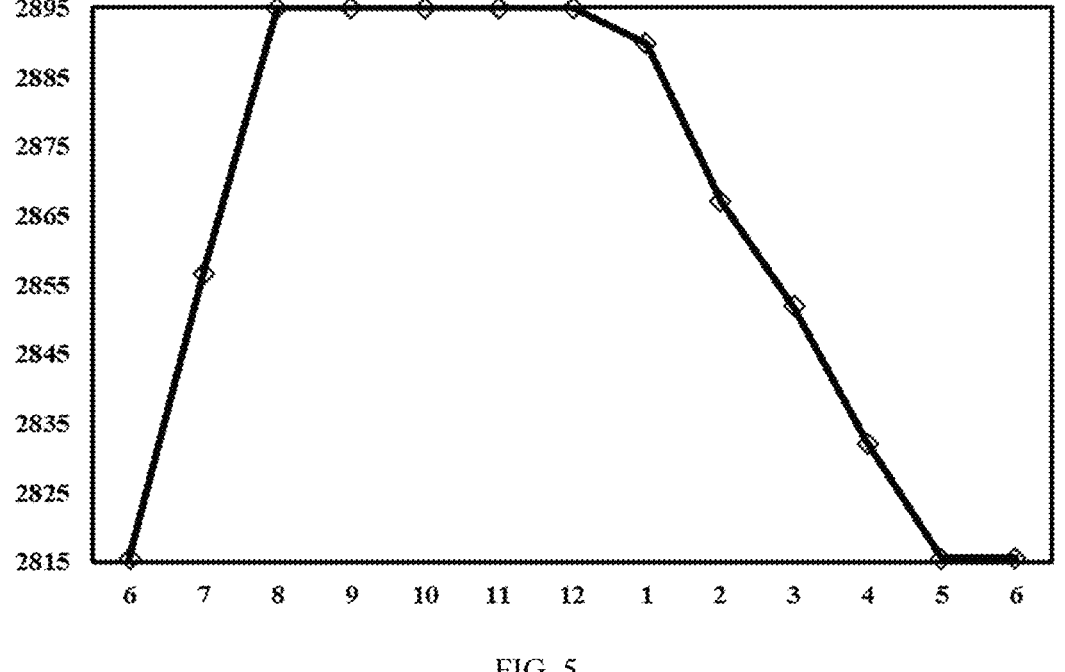
FIG. 5 shows the reservoir level process during the operation cycle.

S5. Judge whether the operation cycle ends; if yes, perform Step S6; otherwise, return to Step S2 to calculate the reservoir level and hydropower output of the next month in the operation cycle;

S6. Obtain reservoir level process and hydropower output process of the clean energy base during the operation cycle; as shown in FIG. 4 to FIG. 5, the hydropower output process of the reservoir and the reservoir level process during the operation cycle meet the operation requirements of the reservoir under the guidance of the sub-operation chart with the runoff probability of 50% to 60%.

The formula of the hydroelectric hydropower generation probability is as follows:

$$P=M/12$$

Wherein, M is the number of months in which the hydropower output of the reservoir is not lower than the hydropower guaranteed output under the guidance of the hydro-photovoltaic complementary operation chart application method; in the embodiment, the hydropower output for 12 months is not lower than the hydropower guaranteed output, m=12, and P=100%, which meet the operation requirements of the reservoir.

The invention provides a hydro-photovoltaic complementary operation chart application system for a clean energy base, which comprises:

A hydro-photovoltaic complementary operation chart dividing module, used to divide the hydro-photovoltaic complementary operation chart into two types of sub-operation charts by the runoff probability and the critical probability, which are divided into different operation areas having respective hydropower output information by operation curves;

A sub-operation chart selecting module, used to predict the runoff and predicted photovoltaic output during the operation cycle, calculate the runoff probability, and select the corresponding sub-operation chart by the runoff probability;

A scheduling module, used to schedule the hydro-photovoltaic complementary operation chart; if the selected sub-operation chart is a conventional operation chart, determine the hydropower output of the reservoir in the current month according to the water level of the reservoir at the beginning of the current month and the operation area, and obtain the water level at the end of the current month through the runoff calculation; if the selected sub-operation chart is a hydro-photovoltaic complementary operation chart, calculate the predicted critical output of the current month based on the predicted photovoltaic output of the current month, judge whether the current month is in the flood season, and take the predicted critical output as the hydropower output in the critical output area if the current month is in the flood season; take the guaranteed output as the hydropower output in the critical output area if the current month is not in the flood season; determine the hydropower output of the reservoir in the current month according to the water level of the reservoir at the beginning of the current month and the operation area, and obtain the water level at the end of the current month through the runoff calculation; obtain the long-term hydropower output process and the reservoir level process in the clean energy base until the hydropower output and water level of the reservoir in all months of the operation cycle are calculated, and obtain the hydropower generation probability to complete the operation.

A device of the invention comprises a memory and a processor, wherein:

The memory is used to store computer programs capable of running on the processor;

The processor is used to execute the steps of the hydro-photovoltaic complementary operation chart application method for the clean energy base when running the computer programs, and achieves the technical effect consistent with that of the application method.

The invention claimed is:

1. A hydro-photovoltaic complementary operation chart application method for a clean energy base, characterized by including following steps:

S1. dividing a hydro-photovoltaic complementary operation chart into two sub-operation charts by runoff probability and critical probability during an operation cycle: conventional operation chart and hydro-photovoltaic complementary operation chart, the sub-operation charts are conventional operation charts when the runoff probability is less than the critical probability, and the sub-operation charts are hydro-photovoltaic complementary operation charts when the runoff probability is more than the critical probability; divide each sub-operation chart into different operation areas by operation curves, and hydropower output information is provided in each operation area;

S2. predicting runoff and predicted photovoltaic output during the operation cycle, and calculate the runoff probability, select the corresponding conventional operation chart if the runoff probability is less than the critical probability, determine hydropower output of a reservoir in a current month according to water level of the reservoir at a beginning of the current month and the operation area, obtain the water level of the reservoir at an end of the current month through the runoff calculation, and then perform Step S5; perform Step S3 if the runoff probability is more than the critical probability;

S3. selecting the hydro-photovoltaic complementary operation chart corresponding to the runoff probability, calculate predicted critical output of the current month according to a predicted hydropower output of the current month, judge whether the current month is in a flood season, and take the predicted critical output as the hydropower output in a critical output area if the current month is in the flood season; take guaranteed output as the hydropower output in the critical output area if the current month is not in the flood season;

S4. determining the hydropower output of the reservoir in the current month according to the water level of the reservoir at the beginning of the current month and the operation area, and obtain the water level at the end of the current month through the runoff calculation;

S5. checking whether the operation cycle ends; if yes, perform Step S6; otherwise, return to Step S2 and calculate the hydropower output and water level of the reservoir in a next month within the operation cycle;

S6. obtaining long-term hydropower output process, reservoir level process and hydropower generation probability in the clean energy base;

S7. obtaining an optimized hydro-photovoltaic complementary operation chart based on the hydropower output process, the reservoir level process and the hydropower generation probability; and S8. performing scheduling on the reservoir based on the optimized hydro-photovoltaic complementary operation chart.

2. The hydro-photovoltaic complementary operation chart application method for the clean energy base according to claim 1, characterized in that the critical probability in Step S1 is as follows:

calculating the runoff probability of multiple operation cycles according to runoff data to form a runoff probability set, and arrange the operation cycles and the corresponding runoff data in ascending order based on the runoff probability;

transferring photovoltaic output data of typical years to establish an optimal operation model, carry out optimal operation calculation for the operation cycles with a goal of maximizing total consumed hydro-photovoltaic power, record discarded power of the operation cycles in the process, and screen the discarded power of the operation cycles according to the runoff probability set until no discarded power is generated in all operation cycles arranged after a certain operation cycle to which the runoff probability corresponds is the critical probability.

3. The hydro-photovoltaic complementary operation chart application method for the clean energy base according to claim 2, characterized in that an objective function of the optimal operation model is as follows:

$$W = \max \sum\nolimits_{m=1}^{M} \left( W_m^h + W_m^p - W_m^q \right);$$

wherein, W is total consumed hydro-photovoltaic power during the operation cycle;

$$W_m^h$$

is consumed hydropower in the month m;

$$W_m^p$$

is consumed photovoltaic power in the month m;

$$W_m^q$$

is discarded power in the month m;

the discarded power during the operation cycle is calculated as follows:

$$G_m = \sum\nolimits_{t=1}^{T} \max\left( N_m^h + N_{m,t}^p - N^c, 0 \right);$$

$$F_m = \sum\nolimits_{t=1}^{T} \min\left\{ N_{m,max}^h - N_m^h, \max\left( N^c - \left( N_{m,t}^p + N_m^h \right), 0 \right) \right\};$$

$$W_m^q = \max(G_m - F_m, 0);$$

$$W^q = \sum_{m=1}^{12} W_m^q;$$

wherein, $W^q$ is discarded power during the operation cycle;

$$N_m^h$$

is hydropower output data of the month m;

$$N_{m,t}^p$$

is 24-Hour photovoltaic output data of the month m; $N^c$ is maximum load of a transmission channel;

$$N_{m,max}^h$$

is upper limit of the hydropower output in the month m; $G_m$ indicates that superimposed output of hydropower and photovoltaic power in the month m exceeds the sum of the maximum load of the transmission channel; $F_m$ represents maximum output space that can be given for the photovoltaic output in the month m while the total hydropower output is unchanged; constraint functions of the optimal operation model are as follows:

water balance constraint, reservoir level constraint, power discharge constraint, discharge volume constraint, reservoir output constraint, and variable nonnegative constraint.

4. The hydro-photovoltaic complementary operation chart application method for the clean energy base according to claim 1, characterized in that the operation curves, operation areas and hydropower output information of the conventional operation chart in Step S1 are as follows:

extracting i operation cycles with the runoff probability less than the critical probability, which form a discarded power operation cycle set, obtain the month under the saturated condition through the optimal operation calculation with the goal of maximizing the total consumed hydro-photovoltaic power and then obtain a water storage hydrograph, obtain a water storage hydrograph set of the discarded power operation cycle set until water storage hydrographs of the discarded power operation cycle set in the flood season are calculated, take upper and lower envelope curves of the water storage hydrograph set to obtain upper and lower basic operation curves in the flood season, and replace the upper basic operation curve with a guide curve;

extracting runoff data of the discarded power operation cycle in a dry season, adjust from water level at the end of the dry season, calculate fixed output in reverse time sequence according to the guaranteed output until the beginning of the dry season to obtain a water supply hydrograph, obtain a water supply hydrograph set of the discarded power operation cycle set until the water supply hydrographs of the discarded power operation cycle set are calculated, and take the upper and lower envelope curves of the water supply hydrograph set to obtain the upper and lower basic operation curves in the dry season;

obtaining the upper and lower basic operation curves of the operation cycle based on the calculation of the water storage hydrograph set of the discarded power operation cycle set for the flood season and the water supply hydrograph set for the dry season, and divide a conventional operation chart into a hydropower increased output area, a hydropower guaranteed output area and a hydropower decreased output area in turn from top to bottom according to the upper and lower basic operation curves;

if the water level in the current operation period is higher than the upper basic operation curve, take increased output as the hydropower output; if the water level in the current operation period is lower than the upper basic operation curve, take decreased output as the hydropower output; if the water level in the current operation period is between the upper and lower basic operation curves, take guaranteed output as the hydropower output.

5. The hydro-photovoltaic complementary operation chart application method for the clean energy base according to claim 1, characterized in that the operation curves, operation areas and hydropower output information of the hydro-photovoltaic complementary operation chart in Step S1 are as follows:

extracting j operation cycles with the runoff probability more than the critical probability, divide the j operation cycles into k groups by the runoff probability to form k complementary operation cycle sets, each of which has multiple operation cycles, and information of the ith complementary operation cycle set is as follows:

(1) obtaining the month under the saturated condition through the optimal operation calculation with the goal of maximizing the consumed hydro-photovoltaic power, calculate the fixed output in reverse time sequence at the end of the month under the saturated condition according to the critical output data until the fixed output is calculated for each period, and then obtain the water storage hydrograph, obtain the water storage hydrograph set of the complementary operation cycle set until the water storage hydrographs of the complementary operation cycle set in the flood season are calculated, take the upper and lower envelope curves of the water storage hydrograph set to obtain the upper and lower basic operation curves in the flood season, and replace the upper basic operation curve with the guide curve;

(2) extracting the runoff data of the complementary operation cycle set in the dry season, adjust from the water level at the end of the dry season, calculate the fixed output in reverse time sequence according to the guaranteed output until the beginning of the dry season to obtain the water supply hydrograph, obtain the water supply hydrograph set of the complementary operation cycle set until the water supply hydrographs of the complementary operation cycle set are calculated, take the upper and lower envelope curves of the water supply hydrograph set to obtain the upper and lower basic operation curves in the dry season;

(3) obtaining the upper and lower basic operation curves of the operation cycle based on the calculation of the water storage hydrograph set of the complementary operation cycle set for the flood season and the water supply hydrograph set for the dry season, and divide the hydro-photovoltaic operation chart into a hydropower increased output area, a hydropower critical output area and a hydropower decreased output area in turn from top to bottom according to the upper and lower basic operation curves;

(4) if the water level in the current operation period is higher than the upper basic operation curve, take the increased output as the hydropower output; if the water level in the current operation period is lower than the upper basic operation curve, take the decreased output as the hydropower output; if the water level in the current operation period is between the upper and lower basic operation curves, take the predicted critical output as the hydropower output;

(5) obtaining the information of the $i^{th}$ complementary operation cycle set, return to Step (1) until the information of k complementary operation cycle sets is obtained, and the calculation is completed.

6. The hydro-photovoltaic complementary operation chart application method for the clean energy base according to claim 5, characterized in that the critical output data is calculated as follows:

$$N_m^h = N_m^{lj} \text{ exists to make } G_m = F_m;$$

wherein, $$N_m^h$$

is hydropower output data of the month m;

$$N_m^{lj}$$

is critical output data; $G_m$ indicates that superimposed output of hydropower and photovoltaic power in the month m exceeds the sum of the maximum load of a transmission channel; $F_m$ represents a maximum output space that can be given for the photovoltaic output in the month m while the total hydropower output is unchanged;

the predicted critical output is calculated as follows:

$$G_m^y = \sum_{t=1}^{T} \max\left(N_m^h + N_{m,t}^{py} - N^c, 0\right);$$

$$F_m^y = \sum_{t=1}^{T} \min\left\{N_{m,max}^h - N_m^h \max\left(N^c - \left(N_{m,t}^{py} + N_m^h\right), 0\right)\right\};$$

$$N_m^h = N_m^{ljy} \text{ exists to make } G_m^y = F_m^y;$$

wherein, $$N_m^{ljy}$$

is predicted critical ouput;

$$N_{m,t}^{py}$$

is 24-hour photovoltaic output data of the month m;

$$G_m^y$$

indicates that superimposed output of hydropower and photovoltaic power in the month m exceeds the sum of the maximum load of a transmission channel;

$$F_m^y$$

represents a maximum output space that can be given for the photovoltaic output in the month m while the total hydropower output is unchanged.

7. The hydro-photovoltaic complementary operation chart application method for the clean energy base according to claim 5, characterized in that when the reservoir operation period is in the flood season, the hydropower output information of the increased output area is the predicted critical output of the current month multiplied by an increase ratio coefficient, which is a constant; the hydropower output information of the decreased output area is the predicted critical output of the current month multiplied by a decrease ratio coefficient, which is a constant;

when the reservoir operation period is in the dry season, the hydropower output information of the increased output area is the hydropower guaranteed output of the current month multiplied by the increase ratio coefficient, which is a constant; the hydropower output information of the decreased output area is the hydropower guaranteed output of the current month multiplied by the decrease ratio coefficient, which is a constant.

8. The hydro-photovoltaic complementary operation chart application method for the clean energy base according to claim 1, characterized in that the calculation formula of the hydropower generation probability in Step S6 is as follows:

$$P=M/12;$$

wherein, M is the number of months in which the hydropower output of the reservoir is not less than the hydropower guaranteed output under guidance of the hydro-photovoltaic complementary operation chart application method.

9. A device, characterized by comprising a memory and a processor, wherein the memory is used to store computer programs capable of running on the processor;

the processor is used to execute the steps of the hydro-photovoltaic complementary operation chart application method for the clean energy base according to claim 1 when running the computer programs.

* * * * *